US011727546B2

(12) United States Patent
Lee et al.

(10) Patent No.: US 11,727,546 B2
(45) Date of Patent: *Aug. 15, 2023

(54) METHOD AND DEVICE FOR CORRECTING IMAGE

(71) Applicants: SAMSUNG ELECTRONICS CO., LTD., Suwon-si (KR); Research & Business Foundation SUNGKYUNKWAN UNIVERSITY, Suwon-si (KR)

(72) Inventors: Sihyung Lee, Yongin-si (KR); Dongjae Kim, Suwon-si (KR); Jae Wook Nam, Suwon-si (KR); Wooram Hong, Yongin-si (KR)

(73) Assignees: SAMSUNG ELECTRONICS CO., LTD., Gyeonggi-Do (KR); RESEARCH & BUSINESS FOUNDATION SUNGKYUNKWAN UNIVERSITY, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,853

(22) Filed: Mar. 9, 2022

(65) Prior Publication Data

US 2022/0198621 A1 Jun. 23, 2022

Related U.S. Application Data

(63) Continuation of application No. 17/084,352, filed on Oct. 29, 2020, now Pat. No. 11,295,420, which is a
(Continued)

(30) Foreign Application Priority Data

Feb. 24, 2017 (KR) .......................... 10-2017-0025065

(51) Int. Cl.
G06T 5/00 (2006.01)
G06T 5/40 (2006.01)
(Continued)

(52) U.S. Cl.
CPC .............. G06T 5/006 (2013.01); G06T 5/008 (2013.01); G06T 5/20 (2013.01); G06T 5/40 (2013.01);
(Continued)

(58) Field of Classification Search
CPC ..................................................... H04N 23/70
See application file for complete search history.

(56) References Cited

U.S. PATENT DOCUMENTS 7,174,038 B2  2/2007  Belykh et al.
8,314,890 B2  11/2012  Hosokawa et al.
(Continued)

FOREIGN PATENT DOCUMENTS

CN  103679643  3/2014
CN  105263390  1/2016
(Continued)

OTHER PUBLICATIONS

Dongjae Kim et al., "Image analysis for measuring rod network properties", Measurement Science and Technology, (2015), vol. 26, pp. 1-19.
(Continued)

Primary Examiner — Edward Park
(74) Attorney, Agent, or Firm — Cantor Colburn LLP

(57) ABSTRACT

A method for correcting an image includes: orthographically correcting an image; removing a curtain artifact by applying a first filter to the orthographically corrected image; correcting brightness of the image, from which the curtain artifact is removed, by applying a second filter to the image, from which the curtain artifact is removed. The first filter includes
(Continued)

a first function and a second function for a first domain and a second domain, which are orthogonal to each other in a frequency region, and the first filter is differentiable and continuous in the first domain and the second domain.

20 Claims, 13 Drawing Sheets

Related U.S. Application Data continuation of application No. 15/902,666, filed on Feb. 22, 2018, now Pat. No. 10,853,922.

(51) Int. Cl.
 G06T 5/20 (2006.01)
 H04N 23/70 (2023.01)
(52) U.S. Cl.
 CPC ... *H04N 23/70* (2023.01); *G06T 2207/10061* (2013.01); *G06T 2207/20056* (2013.01); *G06T 2207/30164* (2013.01)

(56) References Cited

U.S. PATENT DOCUMENTS

| | | | |
|---|---|---|---|
| 8,411,161 B2 | 4/2013 | Yu et al. | |
| 8,928,763 B2 | 1/2015 | Kostyukov et al. | |
| 9,030,554 B2 | 5/2015 | Pichon et al. | |
| 9,131,126 B2 | 9/2015 | Weston | |
| 9,407,838 B2 | 8/2016 | Butte et al. | |
| 10,853,922 B2* | 12/2020 | Lee | G06T 5/20 |
| 11,295,420 B2* | 4/2022 | Lee | G06T 5/20 |
| 2004/0041920 A1 | 3/2004 | Mizukami et al. | |
| 2004/0179620 A1 | 9/2004 | Foo et al. | |
| 2005/0043917 A1 | 2/2005 | Dahlen et al. | |
| 2007/0177038 A1 | 8/2007 | Nakamura et al. | |
| 2008/0259223 A1 | 10/2008 | Read et al. | |
| 2011/0234922 A1 | 9/2011 | Nelson et al. | |
| 2011/0242418 A1 | 10/2011 | Hosokawa et al. | |
| 2012/0128224 A1 | 5/2012 | Yu et al. | |
| 2013/0242199 A1 | 9/2013 | Hatano | |
| 2013/0258324 A1 | 10/2013 | Lee et al. | |
| 2015/0163498 A1 | 6/2015 | Shimada | |
| 2016/0364858 A1 | 12/2016 | Butte et al. | |
| 2017/0046833 A1 | 2/2017 | Lurie et al. | |
| 2017/0230577 A1 | 8/2017 | Ishii | |
| 2018/0247394 A1 | 8/2018 | Lee et al. | |
| 2019/0378468 A1* | 12/2019 | Jinno | G09G 5/003 |

FOREIGN PATENT DOCUMENTS

| | | |
|---|---|---|
| EP | 1713031 | 12/2008 |
| JP | 2009151163 A | 7/2009 |
| JP | 2011211474 A | 10/2011 |
| JP | 2016039166 | 3/2016 |
| JP | 2016149998 A | 8/2016 |
| KR | 1020040053877 A | 6/2004 |
| KR | 100888428 | 3/2009 |
| KR | 100957130 | 5/2010 |
| KR | 1020110081173 | 7/2011 |
| KR | 101376831 | 3/2014 |
| WO | 2007142682 | 12/2007 |

OTHER PUBLICATIONS

Igor Aizenberg, et al., "A windowed Gaussian notch filter for quasi-periodic noise removal", Image and Vision Computing, vol. 26, (2008), pp. 1347-1353.
S. Liu et al., "A Staged Filtering Approach to Kill Curtain Noise in FIB-SEM Images", Vienna, Austria, May 30-Jun. 2, 2016, pp. 1-5.
Tolga Tasdizen, et al., "Non-Uniform Illumination Correction in Transmission Electron Microscopy", MICCAI Workshop on Microscopic Image Analysis with Applications in Biology, (2008), pp. 1-5.
Korean Office Action dated Mar. 31, 2023 issued in corresponding Korean Patent Application No. 10-2017-0025065, (with translation).

* cited by examiner

FIG. 6
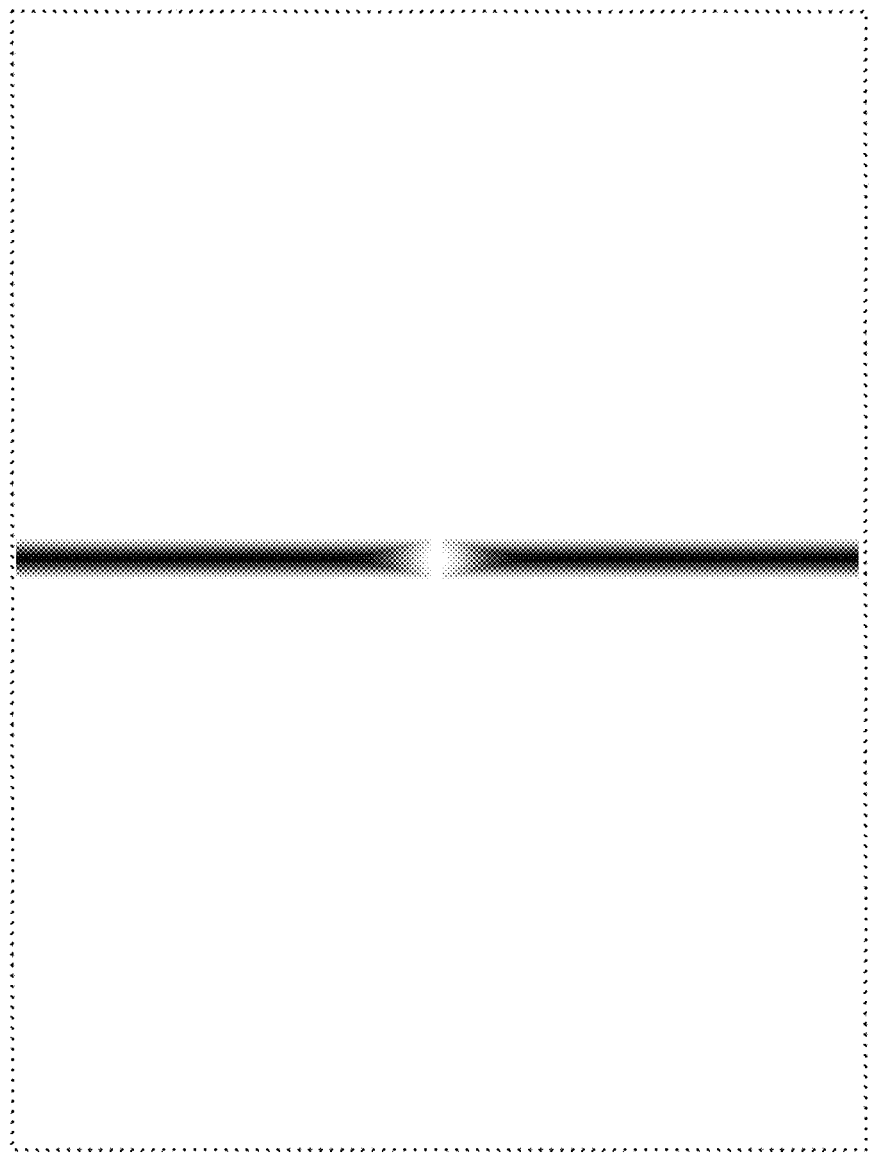
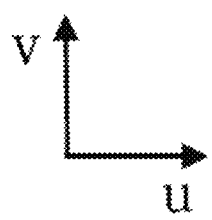

METHOD AND DEVICE FOR CORRECTING IMAGE

CROSS-REFERENCE TO RELATED APPLICATION

This application is a continuation of U.S. patent application Ser. No. 17/084,352, filed on Oct. 29, 2020, which is a continuation of U.S. patent application Ser. No. 15/902,666, filed on Feb. 22, 2018, which claims priority to Korean Patent Application No. 10-2017-0025065, filed on Feb. 24, 2017, and all the benefits accruing therefrom under 35 U.S.C. § 119, the content of which in its entirety is herein incorporated by reference.

BACKGROUND

(a) Field

The disclosure relates to a method and device for correcting an image and performing a material analysis based on the image.

(b) Description of the Related Art

A scanning electron microscope ("SEM") is typically used to capture images of a sample surface by using secondary electrons generated by atoms of a material or roughness of a material surface by shooting accelerated electron beams to the sample surface. When the images of the sample surface is captured using the SEM, a brightness of the image may be determined based on an amount of the secondary electrons detected by a detector. When the roughness of the surface is substantially constant or a type of the material included in the sample is known in advance, the brightness of the captured surface image is proportional to the atomic weight of the material. Therefore, when an image analytic approach is applied to the surface image captured from the SEM, the materials may be distinguished and positions of the materials may be checked.

In addition to the method for distinguishing the materials based on the brightness of the surface image, a method using an energy dispersive spectroscopy ("EDS") may be used as another method for checking the position of the material. The EDS is used to check the disposal of material by measuring energy (e.g., binding energy) of X rays output from the material when the exciting electrons by the electrons shot to the sample surface transit to the ground state. However, since the EDS uses the X rays to measure the energy to deep positions of the material from the surface of the sample, it may be difficult to use the EDS when capturing information on the sample surface. Further, when the EDS is used, it may be difficult to acquire high-magnification information as the SEM.

SUMMARY

When the surface image is captured through the SEM, the material surface has directivity defects including directivity, such that there may be no effective method for quantizing degrees of the directivity defects so that the user may detect the degrees of the directivity defects with eyes, and the directivity defects may be quantized when the directivity defects have periodicity or a regular pattern. Further, when the directivity of the material arrangement is estimated, there may be no effective method for quantitatively estimating degrees for the material arrangement to satisfy a manufacturing purpose. During a process for cutting a matter by using focus ion beams, the processed surface may become non-uniform because of difference of hardness between the materials in an object. Local changes of brightness caused by protrusions and depressions on the surface such as curtain artifacts or waterfall artifacts according to the non-uniformity of the cut side may cause difficulty in analysis, estimation, or distinguishing of materials based on the image brightness. An imbalance of the intensity of illumination on the captured image may be generated depending on photographing conditions such as material characteristics, products, images of substance, or lighting environments of the image capturing process (e.g., the amount of electrons detected by a detector of a microscope).

Embodiments of the invention relate to a method for correcting an image to precisely analyze a material based on an image of the material.

Embodiments of the invention relate to a device for correcting an image to precisely analyze a material based on an image of the material.

An exemplary embodiment of the invention provides a method for correcting an image. In such an embodiment, the method for correcting an image includes: orthographically correcting the image; removing a curtain artifact by applying a first filter to the orthographically corrected image; and correcting brightness of the image, from which the curtain artifact is removed, by applying a second filter to the image from which the curtain artifact is removed, where the first filter includes a first function and a second function for a first domain and a second domain, which are orthogonal to each other in a frequency region, and the first filter is differentiable and continuous in the first domain and the second domain.

In an exemplary embodiment, the orthographically correcting the image may include applying an affine geometric transformation matrix to the image.

In an exemplary embodiment, the first function may be differentiable and continuous in the first domain and the second domain, a border of the first function may be determined by a first differentiable and continuous function which is differentiable and continuous for the second domain, and the second function may be configured with a composition of a notch filter swept in a first direction of the first domain and a second differentiable and continuous function which is differentiable and continuous for the first domain and the second domain.

In an exemplary embodiment, the first differentiable and continuous function may include at least one of a Gaussian function, an exponential function, a logarithmic function, a sinusoidal function, and a polynomial function.

In an exemplary embodiment, the second differentiable and continuous function may include at least one of a Gaussian function, an exponential function, a logarithmic function, a sinusoidal function, and a polynomial function.

In an exemplary embodiment, the first function may be a bar type extending in a first direction of the first domain, and a length of the first function in the first direction may correspond to a length of the image in the first direction.

In an exemplary embodiment, the curtain artifact may be shown in the image in a direction corresponding to an irradiation direction of beams irradiated to cut a side of an object, where the cut side is captured as the image, and the first filter may be a bar type extending in a first direction of the first domain.

In an exemplary embodiment, the removing the curtain artifact may include changing a parameter of the first filter or repeatedly applying the first filter within a predetermined time period or a predetermined number of times.

In an exemplary embodiment, the correcting the brightness may include determining a representative value of brightness corresponding to respective pixels by averaging brightness around the respective pixels included in the image from which the curtain artifact is removed; and correcting the representative value of brightness based on an average value of brightness of the image, from which the curtain artifact is removed.

In an exemplary embodiment, the second filter may be an average filter, and a length of the second filter in a horizontal direction and a length thereof in a vertical direction may be determined by an upper and lower brightness difference of the image, from which the curtain artifact is removed and a right and left brightness difference.

In an exemplary embodiment, the method may further include re-disposing a histogram of the image, the brightness of which is corrected.

According to another exemplary embodiment, a device for correcting an image is provided. In such an embodiment, the image correcting device includes a processor, a memory, and a wired/wireless communication unit, where the processor executes a program stored in the memory to perform: orthographically correcting the image; removing a curtain artifact by applying a first filter to the orthographically corrected image; and correcting brightness of the image from which the curtain artifact is removed by applying a second filter to the image from which the curtain artifact is removed. In such an embodiment, the first filter includes a first function and a second function for a first domain and a second domain that are orthogonal to each other in a frequency region, and the first filter is differentiable and continuous in the first domain and the second domain.

In an exemplary embodiment, when the orthographically correcting the image is performed, the processor may perform applying an affine geometric transformation matrix to the image.

In an exemplary embodiment, the first function may be differentiable and continuous in the first domain and the second domain, a border of the first function may be determined by a first differentiable and continuous function which is differentiable and continuous for the second domain, and the second function may be configured with a composition of a notch filter swept in a first direction of the first domain and a second differentiable and continuous function which is differentiable and continuous for the first domain and the second domain.

In an exemplary embodiment, the first differentiable and continuous function may include at least one of a Gaussian function, an exponential function, a logarithmic function, a sinusoidal function, and a polynomial function.

In an exemplary embodiment, the second differentiable and continuous function may include at least one of a Gaussian function, an exponential function, a logarithmic function, a sinusoidal function, and a polynomial function.

In an exemplary embodiment, the first function may be a bar type extending in a first direction of the first domain, and a length of the first function in the first direction may correspond to a length of the image in the first direction.

In an exemplary embodiment, the curtain artifact may be shown in the image in a direction corresponding to an irradiation direction of beams irradiated to cut a side of an object, where the cut side is captured as the image, and the first filter may be a bar type extending in a first direction of the first domain.

In an exemplary embodiment, when the removing the curtain artifact is performed, the processor may perform changing a parameter of the first filter or repeatedly applying the first filter within a predetermined time or a predetermined number of times.

In an exemplary embodiment, when the correcting the brightness is performed, the processor may perform determining a representative value of brightness corresponding to respective pixels by averaging brightness around the respective pixels included in the image from which the curtain artifact is removed; and correcting the representative value of brightness based on an average value of brightness of the image from which the curtain artifact is removed.

In an exemplary embodiment, the second filter may be an average filter, and a length of the second filter in a horizontal direction and a length thereof in a vertical direction may be determined by an upper and lower brightness difference of the image from which the curtain artifact is removed and a right and left brightness difference.

In an exemplary embodiment, the processor may execute the program to further perform re-disposing a histogram of the image, the brightness of which is corrected.

In exemplary embodiments, accuracy of material analysis through the segmentation of image may be increased by sequentially performing an orthographic correction, a curtain artifact removal, and a brightness uniformity process.

BRIEF DESCRIPTION OF THE DRAWINGS

The above and other features of the invention will become more apparent by describing in further detail exemplary embodiments thereof with reference to the accompanying drawings, in which:

FIG. 6 shows a first filter expressed in a frequency region according to an exemplary embodiment;

DETAILED DESCRIPTION

Figure 1:
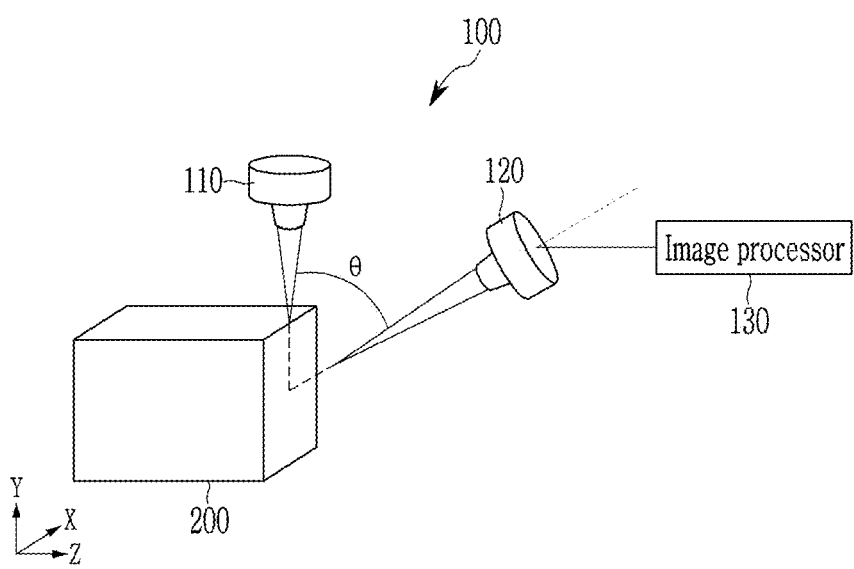
FIG. 1 shows an image processing system according to an exemplary embodiment.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the invention will be described in detail with reference to the accompanying drawings.

FIG. 1 shows an image processing system according to an exemplary embodiment.

Referring to FIG. 1, an exemplary embodiment of the image processing system 100 includes a beam source 110, an image capturing device 120, and an image processor 130.

The beam source 110 scans focus ion beams ("FIB") to an object 200 to cut the object. Referring to FIG. 1, the beam source 110 scans the FIB in a direction parallel to a y direction.

The object 200 may be any kinds of objects, materials, and samples of material that may be tested by a destructive method. Referring to FIG. 1, the object 200 is cut to be parallel to an xy plain by the focus ion beams scanned by the beam source 110.

The image capturing device 120 may capture an image of a surface (also referred to as a cut side) of the object. The image capturing device 120 may include a scanning electron microscope ("SEM"). The image capturing device 120 may be disposed in a position forming a predetermined angle θ with the beam source 110. When the predetermined angle θ is greater than 0° and less than 90°, an extending line of the proceeding direction of the image capturing device 120 is not orthogonal to the surface of the cut object. Hereinafter, exemplary embodiments, where the extending line of the proceeding direction of the image capturing device 120 is not orthogonal to the cut side of the object, will be described in detail.

The image processor 130 may correct the image to perform a material analysis based on the image captured through the image capturing device 120. An exemplary embodiment of a method for the image processor 130 to correct the image will now be described with reference to FIG. 2 to FIG. 12.

Figure 2:
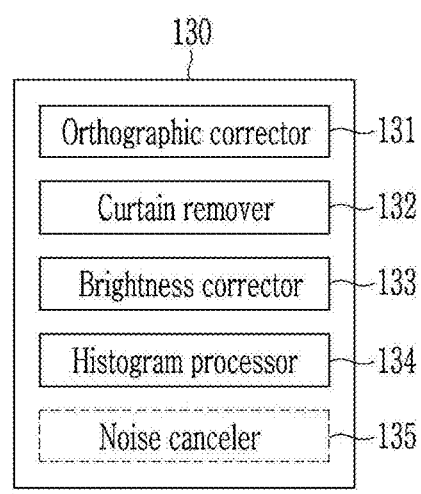
FIG. 2 shows a block diagram of constituent elements of an image processor according to an exemplary embodiment.

FIG. 2 shows a block diagram of constituent elements of an image processor according to an exemplary embodiment.

Referring to FIG. 2, an exemplary embodiment of an image processor 130 includes an orthographic corrector 131, a curtain remover 132, a brightness corrector 133, and a histogram processor 134. The image processor 130 may further include a noise canceler 135.

The orthographic corrector 131 performs an orthographic correction to correct an image distortion that occurs because of the angle between the image capturing device 120 and a surface of the object (i.e., the cut side of the object) from which the image is captured.

The curtain remover 132 applies a filter to the image to correct the image defect arranged in one direction such as vertical stripes that may be generated by the difference of hardness between materials when an object is cut, that is, the directivity defect. In such an embodiment, the curtain remover 132 may remove a physical contamination in the image such as the directivity defect. In such an embodiment, the curtain remover 132 applies a filter to the orthographically corrected image to correct the directivity defect. If the orthographic correction is applied to an image after the curtain artifact of the image is removed by the curtain remover 132, a portion not to be removed may be removed by the filter used by the curtain remover 132 for removing the curtain artifact. The defect appearing on the image in the vertical direction before the orthographic correction may not appear in the vertical direction after the orthographic correction. Accordingly, in an exemplary embodiment, the curtain artifact may be corrected based on the orthographically corrected image.

The brightness corrector 133 estimates an influence of lighting on respective parts of the image and removes the influence of lighting to control the brightness. In such an embodiment, the brightness is made uniform over the entire image. If the brightness of the image including defects is made uniform, attributes of the defect portion are changed and an image analysis may generate errors after a segmentation job. Accordingly, in an exemplary embodiment, the brightness corrector 133 performs a brightness correction after the orthographic correction and the curtain artifact removal are performed. In one exemplary embodiment, for example, the brightness corrector 133 averages the brightness of pixels of the image in the right, left, top, and bottom directions to thus correct the image so that the brightness between adjacent pixels may softly change. If the brightness of the image is corrected before the curtain artifact is removed, the brightness correction is performed on the portion that will be removed by the curtain artifact, and the brightness value of the portion to be removed may be included in the brightness correction process. Accordingly, in an exemplary embodiment, the brightness corrector 133 may perform the brightness correction by applying a filter to the image from which the curtain artifact is removed.

The histogram processor 134 re-disposes the histogram of the image, brightness of which is made uniform, and the noise canceler 135 eliminates the noise generated by the image treating process excluding physical factors. An exemplary embodiment of an operational process of the image processor 130 will now be described with reference to FIG. 3 to FIG. 12.

Figure 3:
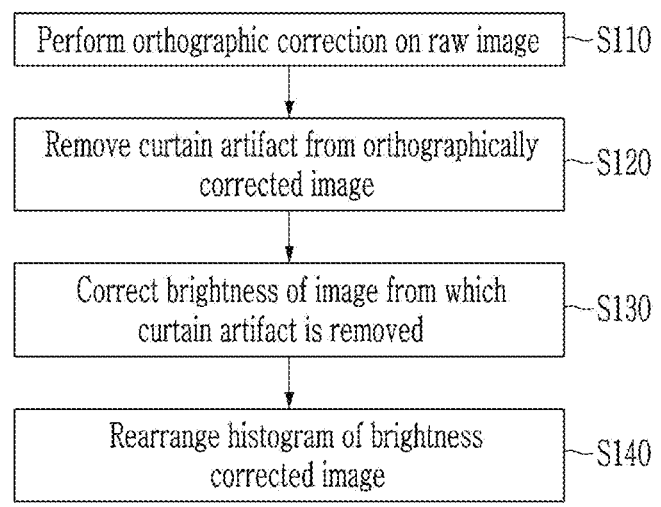
FIG. 3 shows a flowchart of an image correcting method of an image processor according to an exemplary embodiment.
Figure 4:
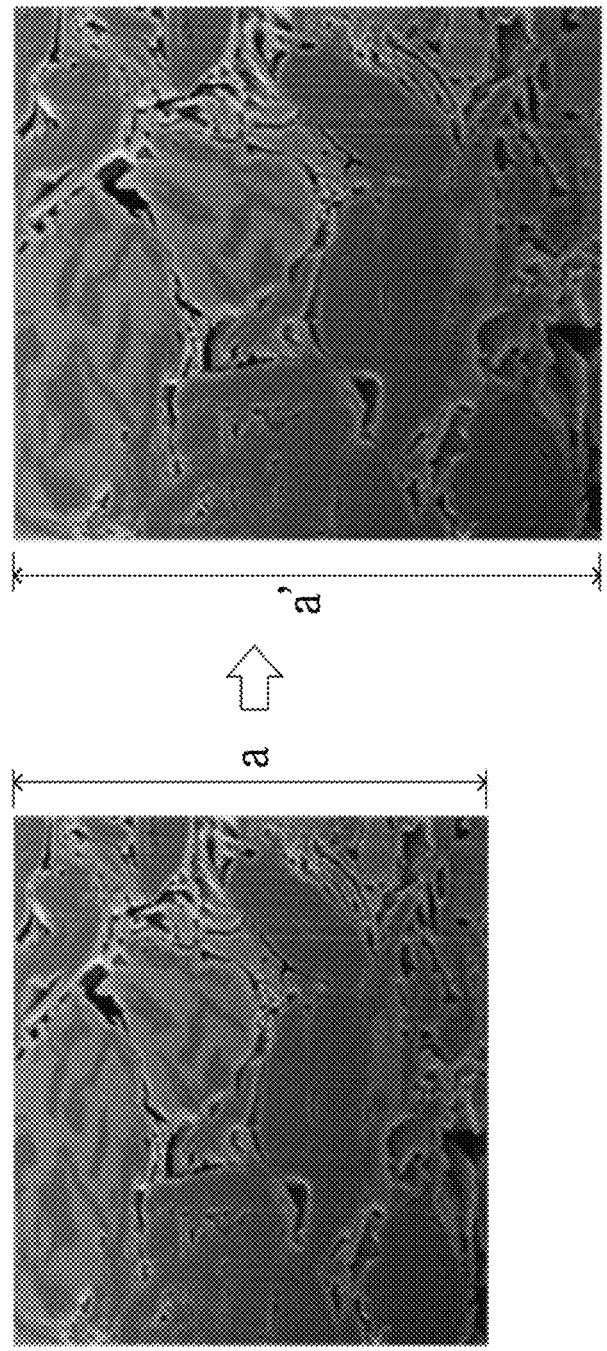
FIG. 4 shows an image before an orthographic correction and an image after an orthographic correction according to an exemplary embodiment.

FIG. 3 shows a flowchart of an image processor according to an exemplary embodiment, and FIG. 4 shows an image before an orthographic correction and an image after an orthographic correction according to an exemplary embodiment.

In an exemplary embodiment, an orthographic correction is performed on a raw image (S110). In one exemplary embodiment, for example, the orthographic corrector 131 of the image processor 130 performs the orthographic correction on the raw image provided by the image capturing device 120. In such an embodiment, the raw image is distorted since the image capturing device 120 is not orthogonal to the cut side of the object. In FIG. 4, the left view is a raw image provided by the image capturing device 120, and the right vies is an orthographically corrected image from the raw image. A length a' of the orthographically corrected image in a y direction is expressed in Equation 1.

$$a' = \frac{a}{\sin\theta} \quad \text{(Equation 1)}$$

In Equation 1, a denotes a y-directional length of the raw image, and θ denotes an angle between the image capturing device 120 and the cut side.

In an exemplary embodiment, the orthographic correction is performed based on an affine geometric transformation to minimize a loss of a pixel resolution of the corrected image and substantially maintain a region of interest ("ROI"). The affine geometric transformation is a linear transformation, and regarding the affine geometric transformation, the line may maintains its form as it is after the transformation, and an operation may be independently performed in the x direction and the y direction. Equation 2 expresses a transformation matrix of the affine geometric transformation.

$$M = \begin{bmatrix} 1 & 0 & 0 \\ 0 & \frac{1}{\sin\theta} & 0 \\ 0 & 0 & 1 \end{bmatrix} \quad \text{(Equation 2)}$$

In Equation 2, M denotes the transformation matrix of the affine geometric transformation.

In an exemplary embodiment, the orthographic correction may be performed by applying the transformation matrix of Equation 2 to the raw image (i.e., an image warping).

In an exemplary embodiment, the curtain artifact is removed from the orthographically corrected image (S120). In one exemplary embodiment, for example, the curtain remover 132 of the image processor 130 removes the curtain artifact from the orthographically corrected image. The curtain artifact represents the artifact that is generated because of the difference of hardness between materials in an object, that is, a local brightness change on the image.

According to an exemplary embodiment, RGB channels of the orthographically corrected image may be separately processed to remove the curtain artifact. The curtain remover 132 may transform (i.e., Fourier transform) the image separated for respective channels into a frequency region to remove the curtain artifact.

Figure 5:
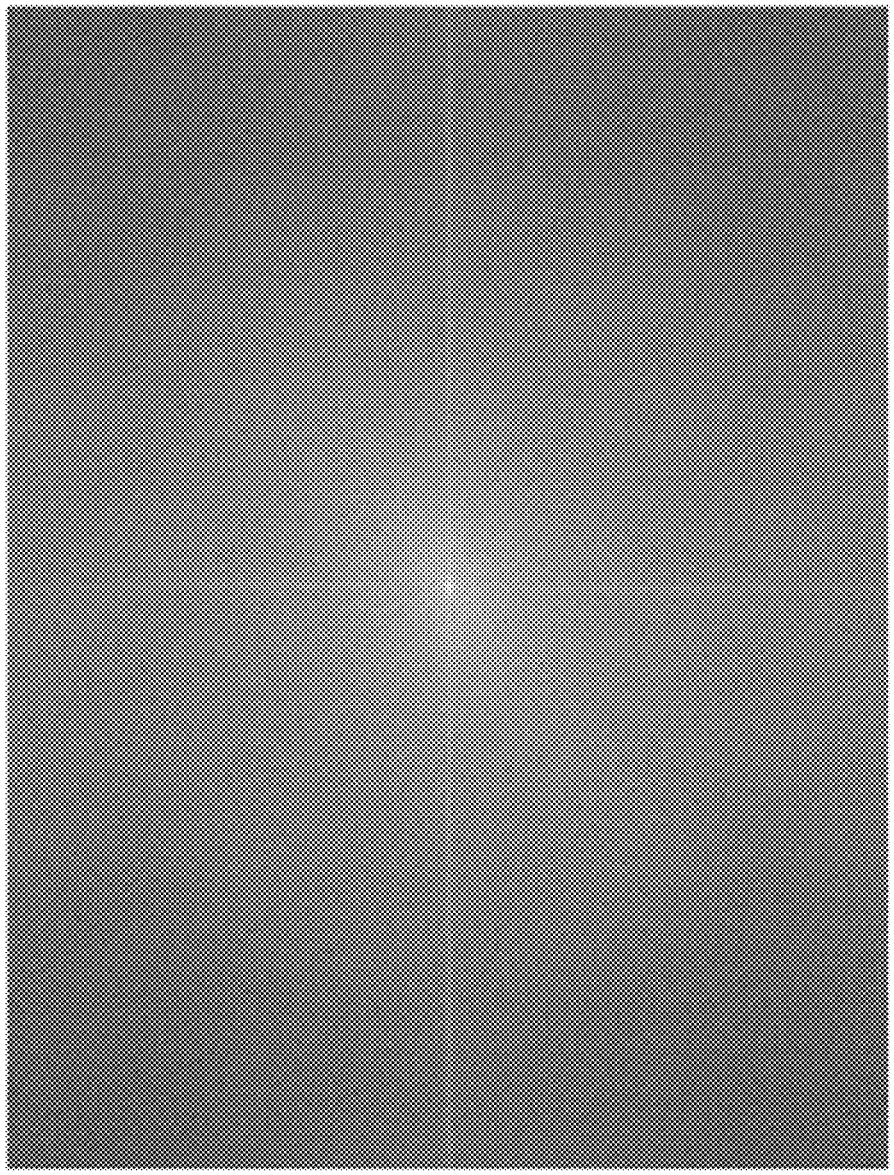
FIG. 5 shows an image converted to a frequency domain according to an exemplary embodiment.

FIG. 5 shows an image converted to a frequency domain according to an exemplary embodiment.

In the image transformed into the frequency region of FIG. 5, the horizontal stripe appearing at the center represents a portion estimated as the curtain artifact. In an exemplary embodiment, the curtain remover 132 applies a first filter to the image transformed into the frequency region to remove the curtain artifact from the orthographically corrected image. In such an embodiment, the first filter may be used to remove the directivity defect from the orthographically corrected image. According to an exemplary embodiment, the curtain artifact shown in the orthographically corrected image represents the defect with directivity going in the y direction, and the first filter is used to remove the curtain artifact that is the directivity defect of the orthographically corrected image. The first filter will now be described in greater detail with reference to FIG. 6 to FIG. 9.

Figure 7:
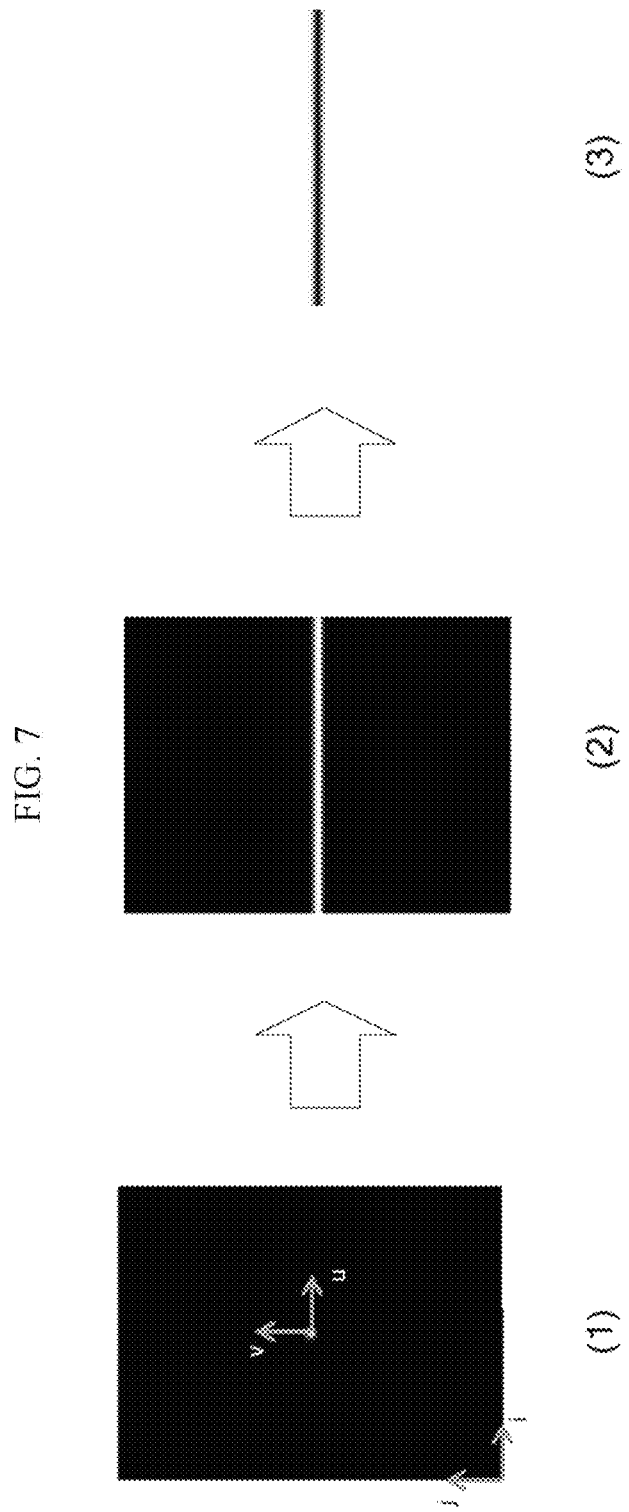
FIG. 7 shows a schematic view of a first function of a first filter according to an exemplary embodiment.
Figure 8:
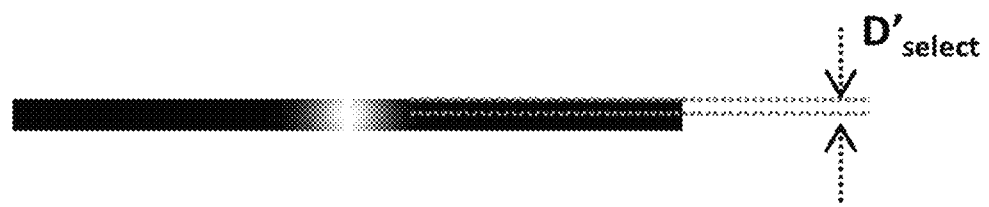
FIG. 8 shows a schematic view of a second function of a first filter according to an exemplary embodiment.
Figure 9:
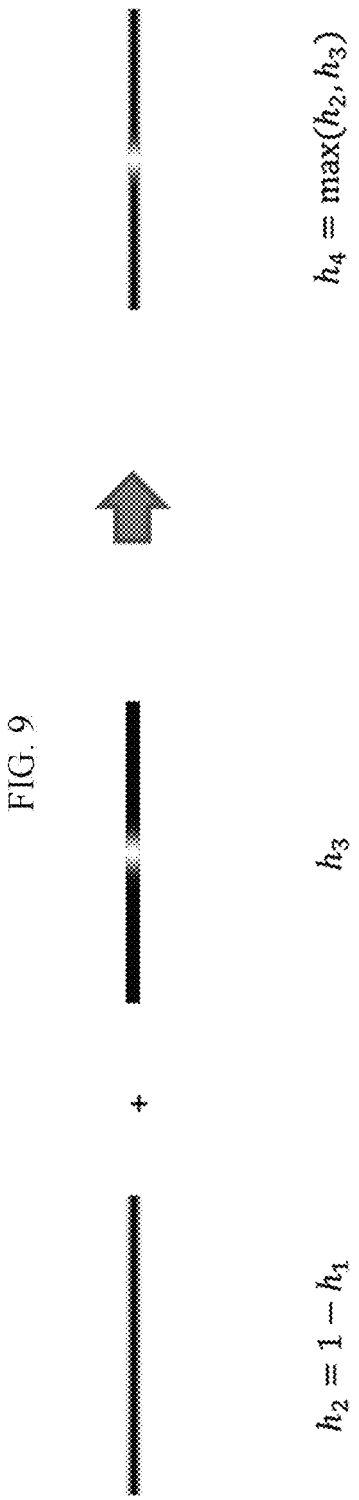
FIG. 9 shows a schematic view of a first filter configured with a first function and a second function according to an exemplary embodiment.

FIG. 6 shows a first filter expressed in a frequency region according to an exemplary embodiment, FIG. 7 shows a schematic view of a first function of a first filter according to an exemplary embodiment, FIG. 8 shows a schematic view of a second function of a first filter according to an exemplary embodiment, and FIG. 9 shows a schematic view of a first filter configured with a first function and a second function according to an exemplary embodiment.

Referring to FIG. 6, in an exemplary embodiment, the first filter is differentiable and continuous in the domains (e.g., u domain (first domain) and v domain (second domain)) that are orthogonal to each other in the frequency region, and is defined with an operation of a first function and a second function of a u-v domain or an i-j domain. Equation 3 expresses the first filter.

$$h_{new} = \left[ F(u, v)_{(sweep\ func.)} \odot G(u, v)_{(sweep\ func.)} \right] \quad \text{(Equation 3)}$$

Referring to Equation 3, in an exemplary embodiment, the first filter $h_{new}$ is defined with an operation ⊙ between two functions F(u,v) (first function) and G(u,v) (second function) in the u-v domain. In such an embodiment, the operation of the first function and the second function may be an operation for showing a bigger value between the first function and the second function or an operation for showing a smaller value between the first function and the second function. In one exemplary embodiment, for example, where the first function is f(u,v) and the second function is g(u,v), the first filter may satisfy the following equation: h(u,v)

=max[f(u,v), g(u,v)] or the following equation: h(u,v)=min [f(u,v), g(u,v)], where h(u,v) denotes the first filter.

Referring to FIG. 6, the first filter has a bar type extending in the u direction. A length of the first filter in the u direction corresponds to the length of the frequency transformed image in the u direction, and a border in a width direction (i.e., v direction) is differentiable and has a continuous form. According to an exemplary embodiment, the first filter is differentiable and continuous at the points in the u-v domain, and when the filter is applied, distortion of the image (e.g., a ringing effect) is reduced, and borders by respective material may be more clearly distinguished. Hereinafter, an exemplary embodiment where Gaussian functions that are differentiable and continuous in the u-v domain is used as the first function and the second function configuring the first filter will be described in detail, but the invention is not limited thereto. According to an alternative exemplary embodiment, other functions (e.g., an exponential function, a logarithmic function, a sinusoidal function, and a polynomial function) that are differentiable and continuous in the u-v domain may be used as the function configuring the first filter as the first function and the second function.

Referring to FIG. 7, in an exemplary embodiment, the first function of the first filter may be determined by (2) sweeping in the u direction (or i direction) of the (1) Gaussian low pass filter, and (3) performing an inverse process. In such an embodiment, the u-directional length of the first function may be determined by the length of the sweeping performed in the u direction, and the length of the sweeping may correspond to the u-directional length of the image transformed into the frequency region. Equation 4 expresses a function ($H_{gL}$) showing a Gaussian low pass filter, Equation 5 expresses a function ($h_1$) showing a Gaussian low pass filter swept in the u direction, and Equation 6 shows an inversion function $h_2$ of $h_1$.

$$H_{gL} = \left(e^{-\frac{D^2(u,v)}{D_0^2}}\right) = \left(e^{-\frac{D^2(u_{i,j},v_{i,j})}{D_0^2}}\right)\Bigg|_{i=\frac{i_{end}}{2}-D,\frac{i_{end}}{2}+D, j=\frac{j_{end}}{2}-D,\frac{j_{end}}{2}+D} \quad \text{(Equation 4)}$$

$$H_{gL}(sweep) = h_1 = \left(e^{-\frac{D^2(u_{i,j},v_{i,j})}{D_0^2}}\right)\Bigg|_{i=0,end, j=\frac{j_{end}}{2}-D,\frac{j_{end}}{2}+D} = \left(e^{-\frac{D^2(u_{i,j},v_{i,j})}{D_0^2}}\right)\Bigg|_{S(i,j)} \quad \text{(Equation 5)}$$

$$h_2 = \left(1 - e^{-\frac{D^2(u_{i,j},v_{i,j})}{D_0^2}}\right)\Bigg|_{i=0,end, j=\frac{j_{end}}{2}-D,\frac{j_{end}}{2}+D} = \left(1 - e^{-\frac{D^2(u_{i,j},v_{i,j})}{D_0^2}}\right)\Bigg|_{S(i,j)} \quad \text{(Equation 6)}$$

Referring to (1) of FIG. 7, in an exemplary embodiment, $H_{gL}$ is formed with respect to an origin (i.e., 0 and 0) in the u-v domain. In such an embodiment, the origin in the u-v domain is a center of the image, and the origin in the i-j domain is a left bottom end of the image. In Equation 4, D(u,v) represents a point in the u-v domain, and $D_0$ shows a cutoff frequency of the Gaussian low pass filter. As $D_0$ becomes smaller, the ringing effect may become bigger. As $D_0$ becomes bigger, performance of the filter may be lowered and the ringing effect may further be reduced. In Equations 5 and 6, $i_{end}$ and $j_{end}$ show an i-axis end and a j-axis end of the image, respectively. In such an embodiment, a function $h_2$ of Equation 6 is used as a first function for configuring the first filter. The first function is differentiable and continuous in the v domain, so the border of the first function is determined by the function that is differentiable and continuous in the v domain. According to Equations 4 to 6, the first function is a Gaussian function included in the Gaussian low pass filter.

Referring to FIG. 8 and Equation 7, a second function $h_3$ of the first filter is determined by a composition of a Gaussian low pass filter and a notch filter.

$$h_3 \begin{cases} = 1, & \text{if } |D| > D'_{select} \\ = e^{-\frac{D^2(u_{i,j},v_{i,j})}{D_0^2}}, & \text{if } |D| \le D'_{select} \end{cases} \quad \text{(Equation 7)}$$

In an exemplary embodiment as shown in Equation 7, the notch filter limits an upper value and a lower value of the v domain. In such an embodiment, points, an absolute value of which in a coordinate of the v domain is greater than $D'_{select}$ are 1, and points, an absolute value of which is less than $D'_{select}$, follows the Gaussian low pass filter.

Finally, as shown in Equation 8, the first filter $h_4$ may be configured by a composition through an operation of maximum values of the first function h2 and the second function h3. FIG. 9 shows a method for composing a first function and a second function through an operation of maximum values.

$$h_4 = \max\left[\left(1 - e^{-\frac{D^2(u_{i,j},v_{i,j})}{D_0^2}}\right)\Bigg|_{S(i,j)}, \left(e^{-\frac{D^2(u_{i,j},v_{i,j})}{D_0^2}}\right)\Bigg|_{D'_{select}}\right] \quad \text{(Equation 8)}$$

$h_1$, $h_2$, $h_3$ and $h_4$ of FIG. 9 correspond to those in Equations 4 to 8, respectively. In an exemplary embodiment, $h_4$ is a first filter, and $h_4$ is a function that is differentiable and continuous in the entire region defined in the u-v domain. According to an exemplary embodiment, $D_0$ of the first function and $D'_{select}$ of the second function are parameters for determining performance of the first filter, and the curtain remover 132 may change the parameters and may apply the first filter to the image. In such an embodiment, a length of the first filter may be changed according to a directivity degree of the defect generated on the image. The length of the first filter shown in FIG. 6 or FIG. 9 is equal to a length of the image in a horizontal direction, and the length of the first filter may be changed according to the directivity of the defect generated on the image and may be applied to the image. In such an embodiment, the curtain remover 132 estimates the degree of removal of directivity defects, and when the directivity defects are insufficiently removed, the curtain remover 132 may remove the maximum amount of directivity defects from the image by changing the parameter of the first filter, or by repeatedly applying the first filter within a predetermined time or a predetermined number of times.

Figure 10:
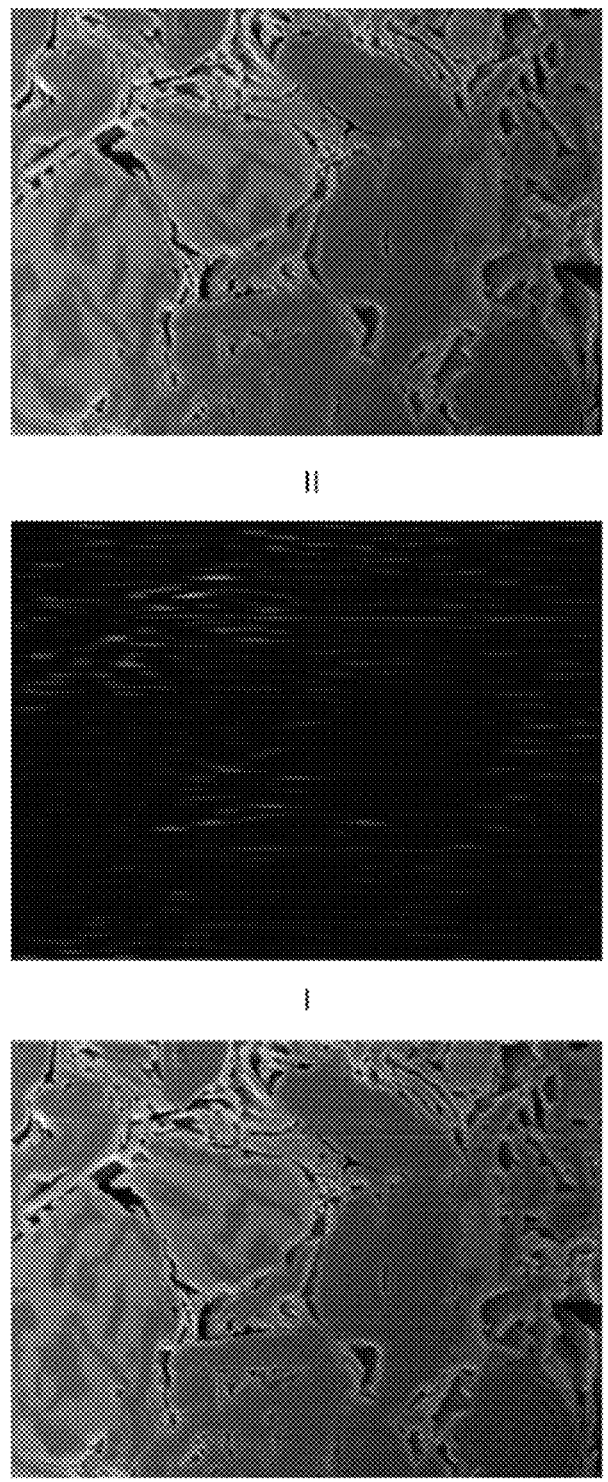
FIG. 10 shows a process for removing a curtain artifact according to an exemplary embodiment.

FIG. 10 shows a process for removing a curtain artifact according to an exemplary embodiment.

Referring to FIG. 10, in an exemplary embodiment, when the curtain artifact (a center image) detected by the first filter, that is, the defect on the image in the vertical direction is removed from the left image (the image transformed into the frequency region), the right image of FIG. 10 may be generated. FIG. 10 shows an image on the x-y plain, and the curtain artifact may be removed by applying the first filter to the orthographically corrected image in the frequency domain (i.e., u-v domain). In such an embodiment, the curtain artifact of the image on the x-y plain is shown to be in the y direction that is the same as the FIB irradiation direction, or a long stripe formed in the direction of the u domain corresponding to the y direction in the u-v domain, and the first filter for removing the curtain artifact in the direction of the u domain is a bar type extending in the direction of the u domain (refer to FIG. 6).

Referring back to FIG. 3, in an exemplary embodiment of an image correcting method, brightness of the image, from which the curtain artifact is removed, is corrected (S130). In one exemplary embodiment, for example, the brightness corrector 133 corrects the brightness of the image from which the curtain artifact is removed. According to an exemplary embodiment, the brightness corrector 133 estimates the influence of lighting on respective parts of the image by applying the second filter to the image, from which the curtain artifact is removed, and controls the brightness by eliminating the influence of lighting.

The whole brightness of the image may not be uniform because of the innate characteristics of the image capturing device 120. The conventional SEM determines the brightness of image in proportion to the amount of received electrons, so the material with a great atomic weight may scatter many electrons and may be expressed to be brighter on the image. However, the amount of received electrons may be different according to the position of the SEM, so in the case of the same material, the brightness of the image may be different depending on the position of the SEM. In an exemplary embodiment, assuming that the acquisition of many electrons depending on the position of the image capturing device 120 is similar to a thing that lighting is applied to a part, a lighting modeling scheme expressed in Equation 9 may be introduced.

$$f(x, y) = s(x, y)l(x, y) + n(x, y) \quad \text{(Equation 9)}$$

In Equation 9, f denotes an image, s denotes a true signal, I denotes lighting, and n denotes noise. In an exemplary embodiment, as in Equation 9, the image is modeled in a way such that noise is added to the product of the true signal and the influence of lighting. In such an embodiment, the lighting smoothly changes, so it is assumed to be a bi-polynomial, and the brightness corrector 133 may remove the influence of lighting from the image by estimating the parameter for minimizing a proposed energy function. According to an exemplary embodiment, the brightness corrector 133 removes a characteristic on the brightness from the image by using the second filter, estimates the influence of lighting by using the above-described lighting modeling scheme, and eliminates the influence of lighting from the image.

Figure 11:
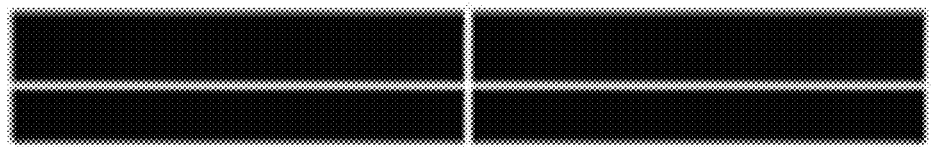
FIG. 11 shows a second filter according to an exemplary embodiment.
Figure 12:
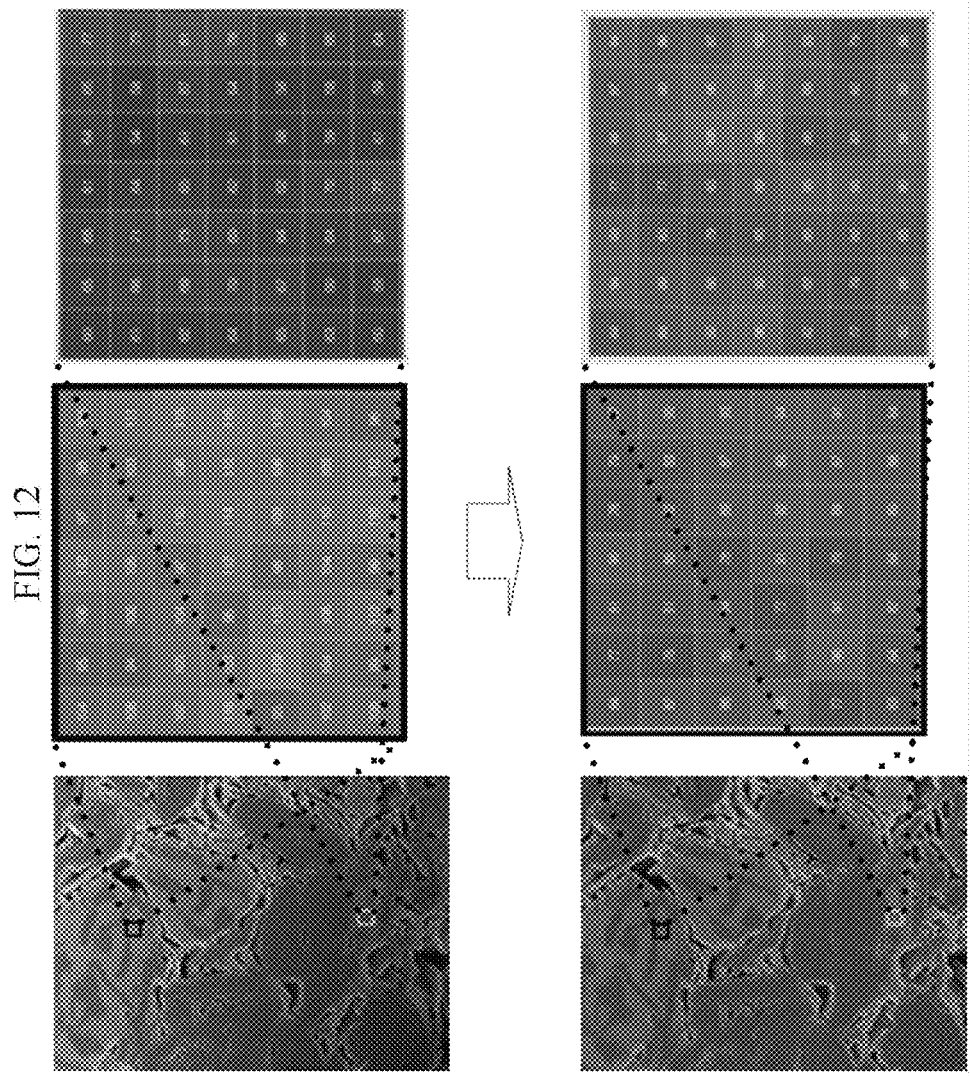
FIG. 12 shows images before and after a brightness control according to an exemplary embodiment.

FIG. 11 shows a second filter according to an exemplary embodiment, and FIG. 12 shows images before and after a brightness control according to an exemplary embodiment.

Referring to FIG. 11, an average filter (shown as a white cross) is shown as a second filter according to an exemplary embodiment. The average filter averages brightness around the respective pixels to determine a representative value of brightness corresponding to the respective pixels, and corrects the representative value of brightness of the respective pixels based on the average value of brightness of the entire image. In one exemplary embodiment, for example, when the representative value of brightness is A and the average value of brightness of the entire image is m, the corrected brightness value of the respective pixels may be 2 m-A. In such an embodiment, the length of the average filter in the horizontal direction and the length thereof in the vertical direction are determined by the directivity of a brightness difference of the image. In one exemplary embodiment, for example, when the difference between the right brightness of the image and the left brightness (referred to as a right and left brightness difference) is greater than the difference between the upper brightness of the image and the lower brightness (referred to as an upper and lower brightness difference), the length of the average filter in the vertical direction becomes greater than the length thereof in the horizontal direction. In such an embodiment, when the upper and lower brightness difference of the image is greater than the right and left brightness difference of the image, the length of the average filter in the horizontal direction becomes greater than the length thereof in the vertical direction to correct the upper and lower direction brightness difference of the image. When the upper and lower brightness difference of the image is greater than the right and left brightness difference, the directivity of the brightness difference is determined to be the upper and lower direction, and in this instance, the representative value of brightness corresponding to the respective pixels is determined to be the average value of brightness in the right and left direction. In this instance, when the average value of brightness in the right and left direction becomes the representative value of brightness of the pixel, the difference between the representative values of brightness in the upper and lower direction may become excessive, so the average value of brightness of the pixels provided above and below pixels is included in the representative value of brightness. Therefore, the length of the average filter in the horizontal direction and the length thereof in the vertical direction are changed depending on the intensity of the brightness difference. The upper and lower brightness difference of the image from which the curtain artifact is removed in FIG. 12 is greater than the right and left brightness difference, so the length of the average filter of FIG. 11 in the horizontal direction is greater than the length thereof in the vertical direction.

In FIG. 12, the brightness difference between two upper and lower parts shown by boxes may be great in the left top side of the image. The left bottom image represents an image, brightness of which is corrected, and the brightness corrected image is corrected so that the brightness shown with the box may be more uniform compared to the image before correction of brightness.

Referring back to FIG. 3, a histogram of the brightness corrected image may be rearranged (S140). In one exemplary embodiment, for example, the histogram processor 134 re-disposes the histogram of the brightness corrected image.

The region of each material in the object may be accurately distinguished through the segmentation process on the corrected image, such that the material may be effectively or efficiently analyzed. According to an exemplary embodiment, noise may be removed by the noise canceler 135 before a segmentation process is performed on the corrected image.

Figure 13:
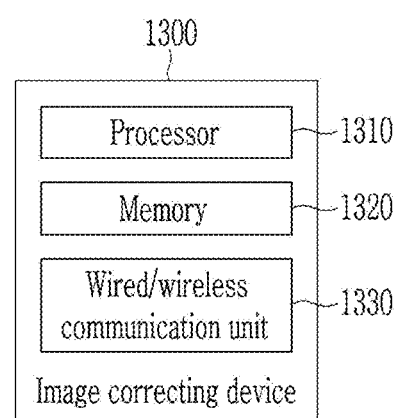
FIG. 13 shows a block diagram of an image correcting device according to an exemplary embodiment.

FIG. 13 shows a block diagram of an image correcting device according to an exemplary embodiment.

Referring to FIG. 13, an exemplary embodiment of the image correcting device 1300 includes a processor 1310, a memory 1320, and a wired/wireless communication unit 1330.

The processor 1310 may realize functions, processes, or methods set forth herein. In an exemplary embodiment, an operation of the image correcting device 1300 may be realized by the processor 1310. The memory 1320 may be connected to the processor 1310 and may store various kinds of information for driving the processor 1310 or a program to be executed by the processor 1310. The wired/wireless communication unit 1330 may receive an image of an object from an image capturing device such as the SEM, and may transmit the image corrected by the image correcting device 1300 to an outside.

According to an exemplary embodiment, the memory 1320 may be disposed inside or outside the processor 1310, and the memory 1320 may be connected to the processor 1310 through a mean known in the art. The memory 1320 is a volatile or non-volatile storage medium in various formats, and for example, the memory 1320 may include a read-only memory ("ROM") or a random access memory ("RAM").

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for correcting an image, the method comprising: orthographically correcting the image; transforming the orthographically corrected image into a frequency region; removing an artifact by applying a first filter to frequency-transformed image; and correcting brightness of the image, from which the artifact is removed, by applying a second filter to the image, from which the artifact is removed, wherein the first filter comprises a first function and a second function for a first domain and a second domain, which are orthogonal to each other in the frequency region and the first filter is differentiable and continuous in the first domain and the second domain, wherein the correcting the brightness comprises: determining a representative value of brightness corresponding to a pixel included in the image from which the artifact is removed by averaging brightness around the pixel; and correcting the representative value of brightness corresponding to the pixel based on an average value of brightness of all pixels in the image from which the artifact is removed.

2. The method for correcting an image of claim 1, wherein the orthographically correcting the image comprises: applying an affine geometric transformation matrix to the image.

3. The method for correcting an image of claim 1, wherein the first function is differentiable and continuous in the first domain and the second domain, a border of the first function is determined by a first differentiable and continuous function which is differentiable and continuous for the second domain, and the second function is configured with a composition of a notch filter swept in the first direction of the first domain and a second differentiable and continuous function which is differentiable and continuous for the first domain and the second domain.

4. The method for correcting an image of claim 3, wherein the first differentiable and continuous function includes at least one of a Gaussian function, an exponential function, a logarithmic function, a sinusoidal function, and a polynomial function.

5. The method for correcting an image of claim 3, wherein the second differentiable and continuous function includes at least one of a Gaussian function, an exponential function, a logarithmic function, a sinusoidal function, and a polynomial function.

6. The method for correcting an image of claim 1, wherein a shape of the first function is a bar type extending in a first direction of the first domain, and a length of the first function in the first direction corresponds to a length of the image in the first direction.

7. The method for correcting an image of claim 1, wherein the artifact is shown in the frequency-transformed image in a first direction corresponding to an irradiation direction of beams irradiated to cut a side of an object, wherein the cut side is captured as the image, and the first filter is a bar type extending in the first direction of the frequency region.

8. The method for correcting an image of claim 1, wherein the removing the artifact comprises: changing a parameter of the first filter or repeatedly applying the first filter within a predetermined time period or a predetermined number of times.

9. The method for correcting an image of claim 1, wherein the second filter is an average filter, and a length of the second filter in a horizontal direction and a length thereof of the second filter in a vertical direction are determined by an upper and lower brightness difference of the image from, which the artifact is removed, and a right and left brightness difference.

10. The method for correcting an image of claim 1, further comprising: re-disposing a histogram of the image, the brightness of which is corrected.

11. A device for correcting an image, the device comprising: a processor; a memory which stores a program; and a wired/wireless communication unit, wherein the processor executes a program stored in the memory to perform: orthographically correcting the image; transforming the orthographically corrected image into a frequency region; removing an artifact by applying a first filter to frequency-transformed image; and correcting brightness of the image, from which the artifact is removed, by applying a second filter to the image from which the artifact is removed, wherein the first filter comprises a first function and a second function for a first domain and a second domain that are orthogonal to each other in the frequency region and the first filter is differentiable and continuous in the first domain and the second domain, wherein the correcting the brightness comprises: determining a representative value of brightness corresponding to a pixel included in the image from which the artifact is removed by averaging brightness around the pixel; and correcting the representative value of brightness corresponding to the pixel based on an average value of brightness of all pixels in the image from which the artifact is removed.

12. The device for correcting an image of claim 11, wherein when the image is orthographically corrected, the processor performs applying an affine geometric transformation matrix to the image.

13. The device for correcting an image of claim 11, wherein the first function is differentiable and continuous in the first domain and the second domain, a border of the first function is determined by a first differentiable and continuous function, which is differentiable and continuous for the second domain, and the second function is configured with a composition of a notch filter swept in the first direction of the first domain and a second differentiable and continuous function, which is differentiable and continuous for the first domain and the second domain.

14. The device for correcting an image of claim 13, wherein the first differentiable and continuous function includes at least one of a Gaussian function, an exponential function, a logarithmic function, a sinusoidal function, and a polynomial function.

15. The device for correcting an image of claim 13, wherein the second differentiable and continuous function includes at least one of a Gaussian function, an exponential function, a logarithmic function, a sinusoidal function, and a polynomial function.

16. The device for correcting an image of claim 11, wherein a shape of the first function is a bar type extending in a first direction of the first domain, and a length of the first function in the first direction corresponds to a length of the image in the first direction.

17. The device for correcting an image of claim 11, wherein the artifact is shown in the frequency-transformed image in a first direction corresponding to an irradiation direction of beams irradiated to cut a side of an object, wherein the cut side is captured as the image, and the first filter is a bar type extending in the first direction of the frequency region.

18. The device for correcting an image of claim 11, wherein when the removing the artifact is performed, the processor performs changing a parameter of the first filter or repeatedly applying the first filter within a predetermined time period or a predetermined number of times.

19. The device for correcting an image of claim 11, wherein the second filter is an average filter, and a length of the second filter in a horizontal direction and a length of the second filter in a vertical direction are determined by an upper and lower brightness difference of the image, from which the artifact is removed, and a right and left brightness difference.

20. The device for correcting an image of claim 11, wherein the processor executes the program to further perform: re-disposing a histogram of the image, the brightness of which is corrected.

\* \* \* \* \*